US010659404B2

(12) United States Patent
Maekawa

(10) Patent No.: US 10,659,404 B2
(45) Date of Patent: May 19, 2020

(54) INFORMATION PROCESSING METHOD, INFORMATION PROCESSING DEVICE, AND RECORDING MEDIUM STORING INFORMATION PROCESSING PROGRAM

(71) Applicant: Panasonic Intellectual Property Management Co., Ltd., Osaka (JP)

(72) Inventor: Hidetsugu Maekawa, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 86 days.

(21) Appl. No.: 16/052,288

(22) Filed: Aug. 1, 2018

(65) Prior Publication Data
US 2019/0058677 A1   Feb. 21, 2019

(30) Foreign Application Priority Data

Aug. 21, 2017 (JP) .................. 2017-158498
Feb. 28, 2018 (JP) .................. 2018-034654

(51) Int. Cl.
*H04L 12/58* (2006.01)
*G06F 3/01* (2006.01)

(52) U.S. Cl.
CPC .......... *H04L 51/046* (2013.01); *G06F 3/011* (2013.01); *H04L 51/12* (2013.01); *G06F 2203/011* (2013.01)

(58) Field of Classification Search
CPC ........ H04L 51/046; H04L 51/12; G06F 3/011; G06F 2203/011
See application file for complete search history.

(56) References Cited

U.S. PATENT DOCUMENTS

2014/0364088 A1* 12/2014 Nakata ................... G06Q 10/10
455/412.2
2015/0061825 A1    3/2015 Suzuki et al.
2016/0322065 A1* 11/2016 Shimoji .................. G10L 25/63
2019/0118887 A1*  4/2019 Kinuhata .............. B60R 16/037

FOREIGN PATENT DOCUMENTS

JP        2005-309585       11/2005
JP        2015-046065        3/2015

* cited by examiner

Primary Examiner — Arvin Eskandarnia
(74) Attorney, Agent, or Firm — Greenblum & Bernstein, P.L.C.

(57) ABSTRACT

An information processing method used in an information processing device, the information processing method includes acquiring, using a processor of the information processing device, biological information of a user, accepting, using the processor, input by the user of message information indicating a message to be transmitted to another information processing device that is different from the information processing device used by the user, determining, using the processor, based on the biological information whether the user is in a bad mood, and when it is determined that the user is in a bad mood, stopping, using the processor, transmission of the accepted message information, and storing, using the processor, the message information, in a memory, that has not been transmitted.

11 Claims, 15 Drawing Sheets

INFORMATION PROCESSING METHOD, INFORMATION PROCESSING DEVICE, AND RECORDING MEDIUM STORING INFORMATION PROCESSING PROGRAM

BACKGROUND

1. Technical Field

The present disclosure relates to an information processing method, used in an information processing device, for transmitting message information to another information processing device that is different from the information processing device used by a user. Also, the present disclosure relates an information processing device, and a recording medium storing an information processing program.

2. Description of the Related Art

In the related art, there are techniques for analyzing an emotion of a user and providing services suitable for the current emotion of the user.

For example, Japanese Unexamined Patent Application Publication No. 2015-46065 discloses an information processing device that collects biological information acquired from a user, determines an emotion of the user by using the collected biological information, and performs an output operation to a terminal device that is used by another user who receives the output data which associates information indicating the user with the determined emotion of the user.

Thus, in an information processing device of the related art, when the user intends to send a message, it is possible to notify the other user to which the message is sent of the mood of the first user in advance.

SUMMARY

In one general aspect, the techniques disclosed here feature an information processing method used in an information processing device. The information processing method includes acquiring, using a processor of the information processing device, biological information of a user, accepting, using the processor, input by the user of message information indicating a message to be transmitted to another information processing device that is different from the information processing device used by the user, determining, using the processor, based on the biological information whether the user is in a bad mood, and when it is determined that the user is in a bad mood, stopping, using the processor, transmission of the accepted message information, and storing, using the processor, the message information, in a memory, that has not been transmitted.

According to the present disclosure, it is possible to prevent message information which is input when the user is in a bad mood from being transmitted to the other information processing device.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided to obtain one or more of such benefits and/or advantages.

DETAILED DESCRIPTION

Figure 1:
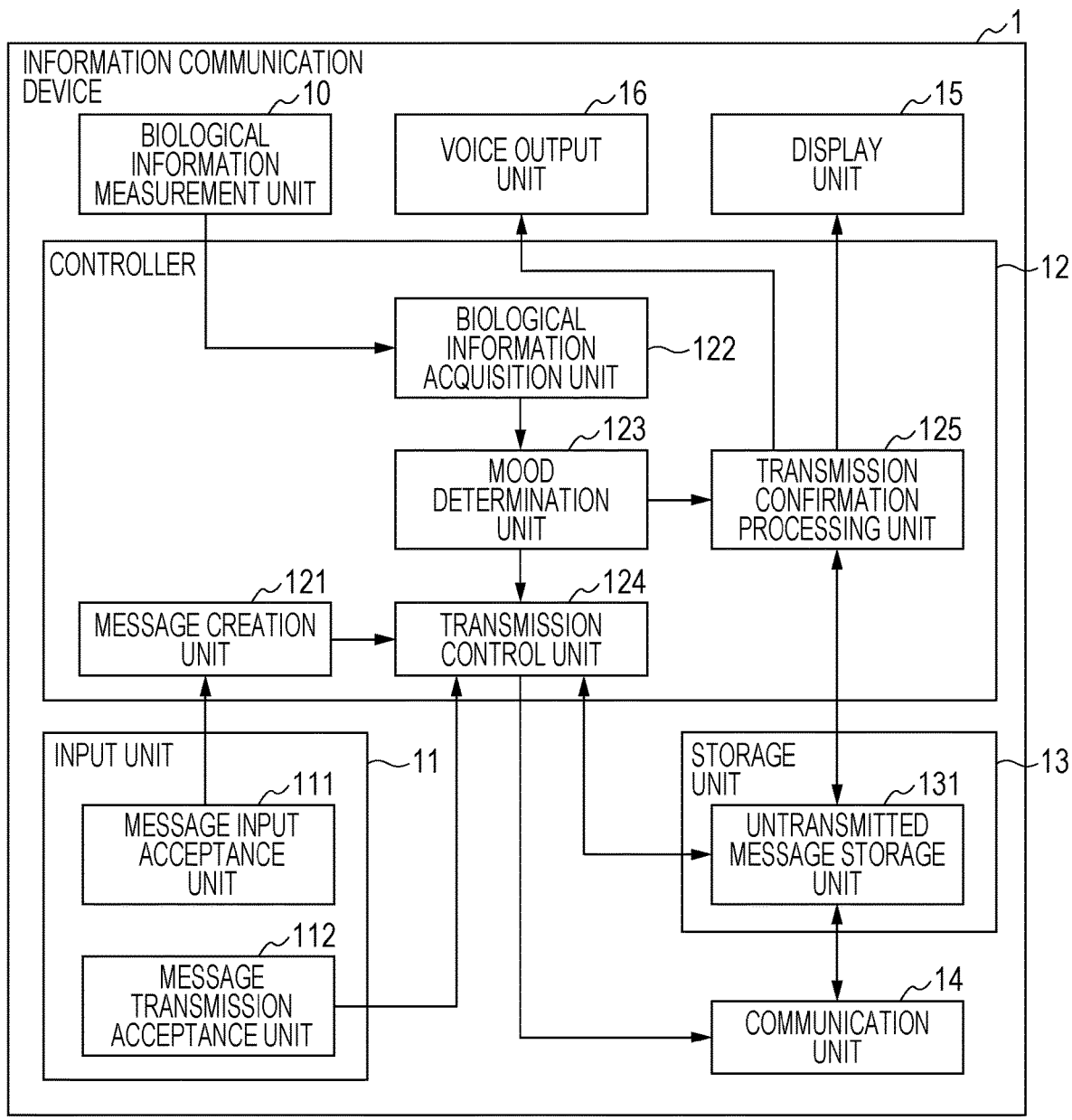
FIG. 1 is a block diagram illustrating an example of a configuration of an information communication device according to a first embodiment of the present disclosure.

Underlying Knowledge Forming Basis of the Present Disclosure

An email created when a user is in a bad mood may contain inappropriate expressions and wordings, and in a case where such an email is immediately transmitted without consideration, it may be unwelcomed by the receiver.

For example, in the above-mentioned Japanese Unexamined Patent Application Publication No. 2015-46065, when a user tries to send a message, the user can determine the mood of the receiver in advance. Japanese Unexamined Patent Application Publication No. 2015-46065, however, does not consider the mood of the user who sends the email. Therefore, in a case where a message created when the user who sends the email is in a bad mood is transmitted, and an inappropriate expression is included in the transmitted message, the transmitted message may be unwelcomed by the receiver.

That is, in the above-mentioned Japanese Unexamined Patent Application Publication No. 2015-46065, the mood of the user who sends the email is not taken into consideration, and further improvement is required.

The present disclosure provides an information processing method, an information processing device, and a recording medium storing information processing program which can prevent message information which is input when the user is in a bad mood from being transmitted to another information processing device.

An information processing method according to an aspect of the present disclosure relates to an information processing method used in an information processing device. The information processing method includes acquiring, using a processor of the information processing device, biological information of a user, accepting, using the processor, input by the user of message information indicating a message to be transmitted to another information processing device that is different from the information processing device used by the user, determining, using the processor, based on the biological information whether the user is in a bad mood, and when it is determined that the user is in a bad mood, stopping, using the processor, transmission of the accepted message information, and storing, using the processor, the message information, in a memory, that has not been transmitted.

According to this configuration, the biological information of the user is acquired. Input by the user of message information indicating a message to be transmitted to the other information processing device is accepted. It is determined based on the biological information whether the user is in a bad mood. In a case where it is determined that the user is in a bad mood, transmission of the accepted message information is stopped, and the message information that has not been transmitted is stored in a memory.

Thus, it is possible to prevent message information which is input when the user is in a bad mood from being transmitted to the other information processing device.

In addition, the information processing method may include acquiring new biological information of the user after it is determined that the user is in a bad mood, determining based on the new biological information whether the user is in a bad mood, accepting selection by the user of whether to transmit the message information that has not been transmitted in a case where it is determined based on the new biological information that the user is in a good mood, and transmitting the message information stored in the memory in a case where the user selects to transmit the message information that has not been transmitted.

According to this configuration, after it is determined that the user is in a bad mood, new biological information of the user is acquired, and it is determined based on the new biological information whether the user is in a bad mood. In a case where it is determined based on the new biological information that the user is in a good mood, selection by the user of whether to transmit the message information that has not been transmitted is accepted. The message information stored in the memory is transmitted in a case where the user selects to transmit the message information that has not been transmitted.

Thus, since selection by the user of whether to transmit the message information that has not been transmitted is accepted at a timing when it is determined that the user is in a good mood after it is determined that the user is in a bad mood, the user can verify, in a calm state, the message information input when the user was in a bad mood.

In addition, the information processing method may include discarding the message information stored in the memory in a case where the user selects not to transmit the message information that has not been transmitted.

According to this configuration, the message information stored in the memory is discarded in a case where the user selects not to transmit the message information that has not been transmitted. Thus, unnecessary information can be discarded from the memory.

In addition, the information processing method may further include accepting correction by the user of the message information stored in the memory, and transmitting the corrected message information.

According to this configuration, correction by the user of the message information stored in the memory is accepted. Then, the corrected message information is transmitted.

Thus, since correction of the message information that has not been transmitted is accepted, it is possible to ease the burden of the user re-entering the message information.

In addition, the information processing method may further include determining whether predetermined wording is included in the accepted message information, and transmitting the accepted message information in a case where it is determined that the predetermined wording is included in the accepted message information.

According to this configuration, it is determined whether predetermined wording is included in the accepted message information. The accepted message information is transmitted in a case where it is determined that the predetermined wording is included in the accepted message information.

Even if the message information is created when the user is in a bad mood, the message information is transmitted in a case where the message information includes predetermined wording. Thus it is not necessary to verify whether to transmit the message information when the user becomes in a good mood, and the unnecessary verification process can be omitted.

In addition, in the information processing method, the accepting of the selection may include presenting the message information that has not been transmitted in a case where it is determined based on the new biological information that the user is in a good mood, displaying, on a display unit, a display screen for accepting selection by the user of whether to transmit the message information that has not been transmitted, and accepting the selection by the user of whether to transmit the message information that has not been transmitted.

According to this configuration, in a case where it is determined based on the new biological information that the user is in a good mood, message information that has not been transmitted is presented, and a display screen for accepting selection by the user of whether to transmit message information that has not been transmitted is displayed on a display unit. Selection by the user of whether to transmit the message information that has not been transmitted is accepted.

Thus, the user can verify, on the display screen, message information created when the user is in a bad mood.

In addition, the information processing method may include after the display screen is displayed, in a case where a selection operation by the user is not accepted for a predetermined time, outputting, to a voice output unit, voice information prompting the user to select whether to the transmit message information that has not been transmitted.

According to this configuration, after the display screen is displayed, in a case where the selection operation by the user is not accepted for a predetermined time, voice information prompting the user to select whether to transmit message information that has not been transmitted is output to the voice output unit.

Thus, it is possible to notify, by voice, the user who cannot see the display screen of whether to transmit message information that has not been transmitted.

In addition, the information processing method may further include determining whether predetermined wording is included in the message information that has not been transmitted, and in a case where it is determined that the predetermined wording is included in the message information that has not been transmitted, displaying the predetermined wording included in the message information in a form different from a form of other words.

According to this configuration, it is determined whether predetermined wording is included in the message information that has not been transmitted. In a case where it is determined that the predetermined wording is included in the message information that has not been transmitted, the predetermined wording included in the message information is displayed in a form different from that of the other words. Therefore, for example, in a case where the message information contains a word that is unwelcomed by the receiver, the word is displayed in a form different from a form of the other words, so that the user can be notified.

In addition, in the information processing method, the accepting of the selection includes presenting the message information that has not been transmitted in a case where it is determined based on the new biological information that the user is in a good mood, outputting, to a voice output unit, voice information for accepting the selection by the user of whether to transmit the message information that has not been transmitted, and accepting the selection by the user of whether to transmit the message information that has not been transmitted.

According to this configuration, in a case where it is determined based on the new biological information that the user is in a good mood, message information that has not been transmitted is presented, and voice information for accepting selection by the user of whether to transmit message information that has not been transmitted is output to the voice output unit. Selection by the user of whether to transmit the message information that has not been transmitted is accepted.

Thus, the user can verify, by voice, message information created when the user is in a bad mood.

An information processing device according to another aspect of the present disclosure may include a processor; and a memory. The processor acquires biological information of a user, accepts input by the user of message information indicating a message to be transmitted to another information processing device that is different from the information processing device used by the user, determines based on the biological information whether the user is in a bad mood, and when it is determined that the user is in a bad mood, stops transmission of the accepted message information, and stores, in the memory, the message information that has not been transmitted.

According to this configuration, the biological information of the user is acquired. Input by the user of message information indicating a message to be transmitted to the other information processing device is accepted. It is determined based on the biological information whether the user is in a bad mood. In a case where it is determined that the user is in a bad mood, transmission of the accepted message information is stopped, and the message information that has not been transmitted is stored in the memory.

Thus, it is possible to prevent message information which is input when the user is in a bad mood from being transmitted to the other information processing device.

A recording medium according to still another aspect of the present disclosure is a non-transitory recording medium storing an information processing program causing a processor of an information processing device to execute a process. The process includes acquiring biological information of a user, accepting input by the user of message information indicating a message to be transmitted to another information processing device that is different from the information processing device used by the user, determining based on the biological information whether the user is in a bad mood, and when it is determined that the user is in a bad mood, stopping transmission of the accepted message information, and storing, in a memory, the message information that has not been transmitted.

According to this configuration, the biological information of the user is acquired. Input by the user of message information indicating a message to be transmitted to the other information processing device is accepted. It is determined based on the biological information whether the user is in a bad mood. In a case where it is determined that the user is in a bad mood, transmission of the accepted message information is stopped, and the message information that has not been transmitted is stored in the memory.

Thus, it is possible to prevent message information which is input when the user is in a bad mood from being transmitted to the other information processing device.

Embodiments of the present disclosure will be described with reference to the accompanying drawings. Note that the following embodiments are merely specific examples of the present disclosure and do not limit the technical scope of the present disclosure.

First Embodiment

FIG. 1 is a block diagram illustrating an example of a configuration of an information communication device according to a first embodiment of the present disclosure. An information communication device 1 is, for example, a smartphone, a tablet computer, or a personal computer. Note that the information communication device 1 is an example of an information processing device.

The information communication device 1 includes a biological information measurement unit 10, an input unit 11, a controller 12, a storage unit 13, a communication unit 14, a display unit 15, and a voice output unit 16.

The biological information measurement unit 10 includes, for example, various sensors, and performs measurement and acquisition of biological information of the user. In addition, the biological information measurement unit 10 performs measurement and acquisition of biological information of the user at predetermined time intervals. For example, the biological information includes the user's blood flow, heart rate, pulse rate, electroencephalogram, blood pressure, biological gas, respiration, body temperature, and the like. For example, the biological information measurement unit 10 includes a sensor that measures a pulse wave of the user in a non-contact manner by using high-sensitivity spread-spectrum millimeter wave radar or the like, and detects heart rate and the heart rate variation of the user.

Note that the configuration of the biological information measurement unit 10 is not particularly limited to this example, and a smartwatch for measuring biological information of a human being may be attached to the user and biological information or the like may be acquired from the smartwatch. In this case, the information communication device 1 may include a biological information receiving unit that receives the measured biological information. In addition, the biological information measurement unit 10 may be a camera, and may capture the facial expression of the user and acquire its photographed image.

The input unit 11 is an interface such as, for example, a touch panel display, a keyboard or a mouse, and accepts various input operations performed by the user. The input unit 11 includes a message input acceptance unit 111 and a message transmission acceptance unit 112.

The controller 12 is, for example, a central processing unit (CPU), and controls the entire information communication device 1. The controller 12 includes a message creation unit 121, a biological information acquisition unit 122, a mood determination unit 123, a transmission control unit 124, and a transmission confirmation processing unit 125.

The storage unit 13 is, for example, a semiconductor memory or a hard disk drive and includes an untransmitted message storage unit 131.

The display unit 15 is, for example, a liquid crystal display and displays various information. The voice output unit 16 is, for example, a speaker, and outputs various voice information.

The message input acceptance unit 111 accepts input by the user of message information indicating a message to be transmitted to a first information communication device that is different from a second information communication device used by a user.

The message creation unit 121 creates message information to be transmitted to the first information communication device. The message creation unit 121 displays on the display unit 15 a display screen for creating message information, and acquires from the message input acceptance unit 111 message information which is input by the user.

The biological information acquisition unit 122 acquires biological information measured by the biological information measurement unit 10.

The mood determination unit 123 determines based on the biological information acquired by the biological information acquisition unit 122 whether the user is in a bad mood. The mood determination unit 123 calculates an emotional state value at the current time based on the biological information. For example, the mood determination unit 123 stores in advance a table in which the value of the biological information is associated with the emotional state value, or a function for converting the value of the biological information into the emotional state value. The mood determination unit 123 reads the emotional state value associated with the value of the acquired biological information from the table or substitutes the value of the acquired biological information into the function to calculate the emotional state value.

Figure 2:
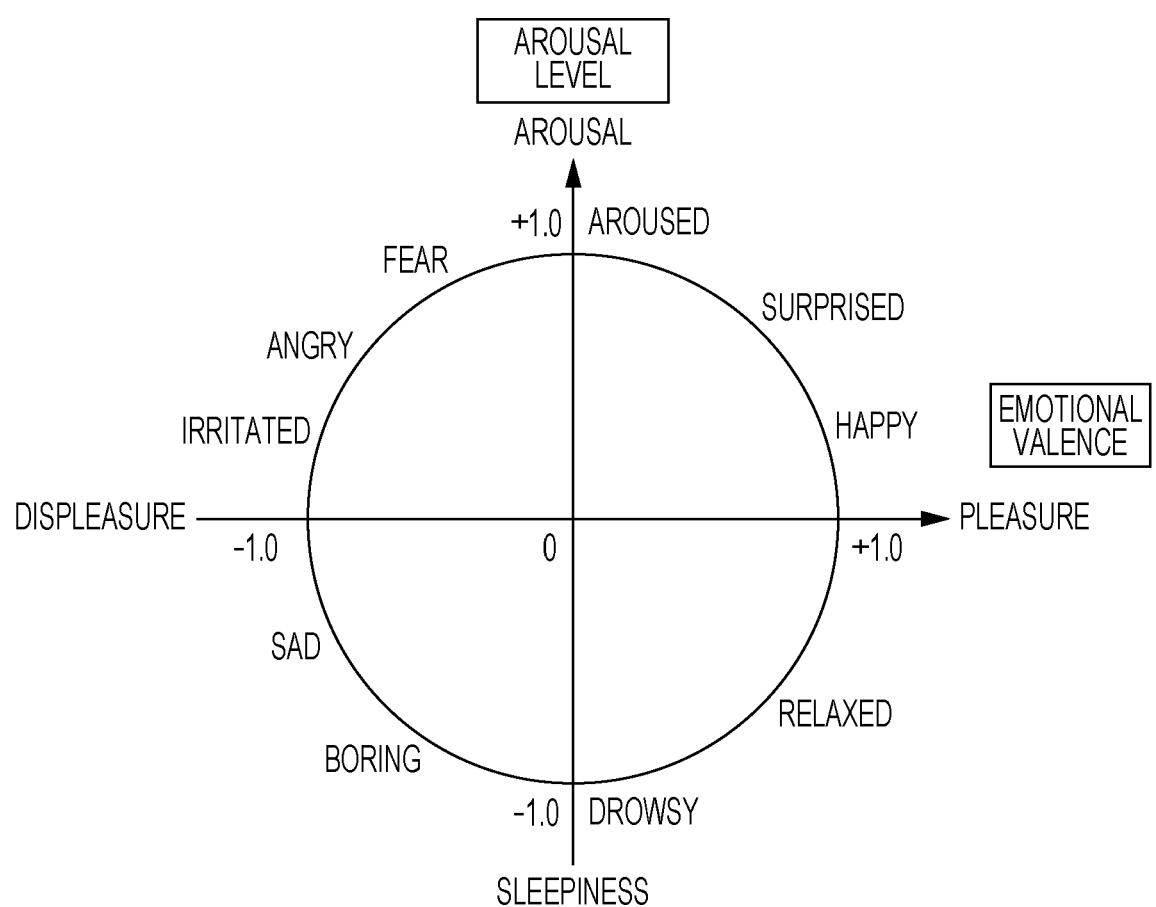
FIG. 2 is a diagram for explaining emotional state values calculated by a mood determination unit according to the first embodiment.

FIG. 2 is a diagram for explaining emotional state values calculated by a mood determination unit according to the first embodiment. In FIG. 2, the vertical axis shows an arousal level and the horizontal axis shows emotional valence.

The emotional state value is expressed by two-dimensional coordinates indicating the arousal level and emotional valence. The mood determination unit 123 calculates emotional state values in two-dimensional coordinates. The two-dimensional coordinates illustrated in FIG. 2 are based on the circumplex model of affect by Russell (James A. Russell, "A Circumplex Model of Affect", Journal of Personality and Social Psychology, 1980, Vol. 39, No. 6, 1161-1178).

The arousal level is indicated by a value from $-1.0$ (sleepiness) to $+1.0$ (arousal), and emotional valence is indicated by a value from $-1.0$ (displeasure) to $+1.0$ (pleasure).

In a case where the value of the emotional valence of the calculated emotional state value is lower than 0 ($-1.0 \leq$ emotional valence$<0$ and $-1.0 \leq$ arousal level$\leq +1.0$), the mood determination unit 123 determines that the user is in a bad mood. In a case where the value of the emotional valence of the calculated emotional state value is 0 or more ($0 \leq$ emotional valence$\leq +1.0$ and $-1.0 \leq$ arousal level$\leq +1.0$), the mood determination unit 123 determines that the user is in a good mood. That is, in a case where the calculated emotional state value is in the second quadrant or the third quadrant, the mood determination unit 123 determines that the user is in a bad mood, and in a case where the calculated emotional state value is in the first quadrant or the fourth quadrant, the mood determination unit 123 determines that the user is in a good mood.

Note that in a case where the calculated emotional state value is in the second quadrant, the mood determination unit 123 may determine that the user is in a bad mood, and in a case where the calculated emotional state value is in the first quadrant, the third quadrant, or the fourth quadrant, the mood determination unit 123 may determine that the user is not in a bad mood.

In addition, the mood determination unit 123 may specify the emotion of the user from the calculated emotional state value, and may determine based on the specified emotion of the user whether the user is in a bad mood. For example, in a case where the emotion of the user specified from the calculated emotional state value represents "anger", the mood determination unit 123 may determine that the user is in a bad mood, and in a case where the emotion of the user specified from the calculated emotional state value represents an emotion other than "anger", the mood determination unit 123 may determine that the user is in a good mood.

Note that the determination of the mood of the user by the mood determination unit 123 is not limited to the above description, and the mood determination unit 123 may determine whether the user is in a bad mood by using at least one of the expression of the user, the movement of the leg of the user, and the uttered voice volume of the user. Japanese Unexamined Patent Application Publication No. 2012-146208 discloses the determination of the mood of the user where the determination is performed by using at least one of the expression of the user, the movement of the leg of the user, and the uttered voice volume of the user.

In addition, the mood determination unit 123 may input plural pieces of biological information of the user into a recognition algorithm based on a machine learning method to recognize the emotion of the user.

Furthermore, a method of determining whether the user is in a bad mood can, for example, employ the techniques disclosed in International Publication No. 2016/170810, Japanese Unexamined Patent Application Publication No. 2009-208727, and Japanese Unexamined Patent Application Publication No. 2015-46065.

In a case where the mood determination unit 123 determines that the user is in a bad mood, the transmission control unit 124 stops transmitting the accepted message information, and the message information that has not been transmitted is stored in the untransmitted message storage unit 131.

The untransmitted message storage unit 131 stores message information that has not been transmitted by the transmission control unit 124.

In a case where the mood determination unit 123 determines that the user is in a good mood, the transmission control unit 124 outputs the accepted message information to the communication unit 14. The communication unit 14 transmits the message information which is input from the transmission control unit 124 to the first information communication device.

The communication unit 14 transmits the message information to the first information communication device and receives message information from the first information communication device. The communication unit 14 includes, for example, a communication circuit, and the transmission of the message information and the reception of the message information may be performed by the communication circuit.

In a case where it is determined that the user is in a good mood after it is determined that the user is in a bad mood, the transmission confirmation processing unit 125 presents message information that has not been transmitted, and displays on the display unit 15 a display screen for accepting selection by the user of whether to transmit message information that has not been transmitted.

In a case where it is determined that the user is in a good mood after it is determined that the user is in a bad mood, the message transmission acceptance unit 112 accepts selection by the user of whether to transmit message information that has not been transmitted. In a case where the user selects to transmit the message information that has not been transmitted by the message transmission acceptance unit 112, the transmission control unit 124 transmits the message information stored in the untransmitted message storage unit 131. Note that in a case where the user selects not to transmit the message information that has not been transmitted by the message transmission acceptance unit 112, the transmission control unit 124 discards the message information stored in the untransmitted message storage unit 131.

In addition, after the display screen is displayed, in a case where the selection operation by the user is not accepted for a predetermined time, the transmission confirmation processing unit 125 outputs to the voice output unit 16 voice information prompting the user to select whether to transmit message information that has not been transmitted. The voice output unit 16 outputs the voice information that has been input from the transmission confirmation processing unit 125.

Next, the operation of the information communication device 1 according to the first embodiment will be described.

Figure 3:
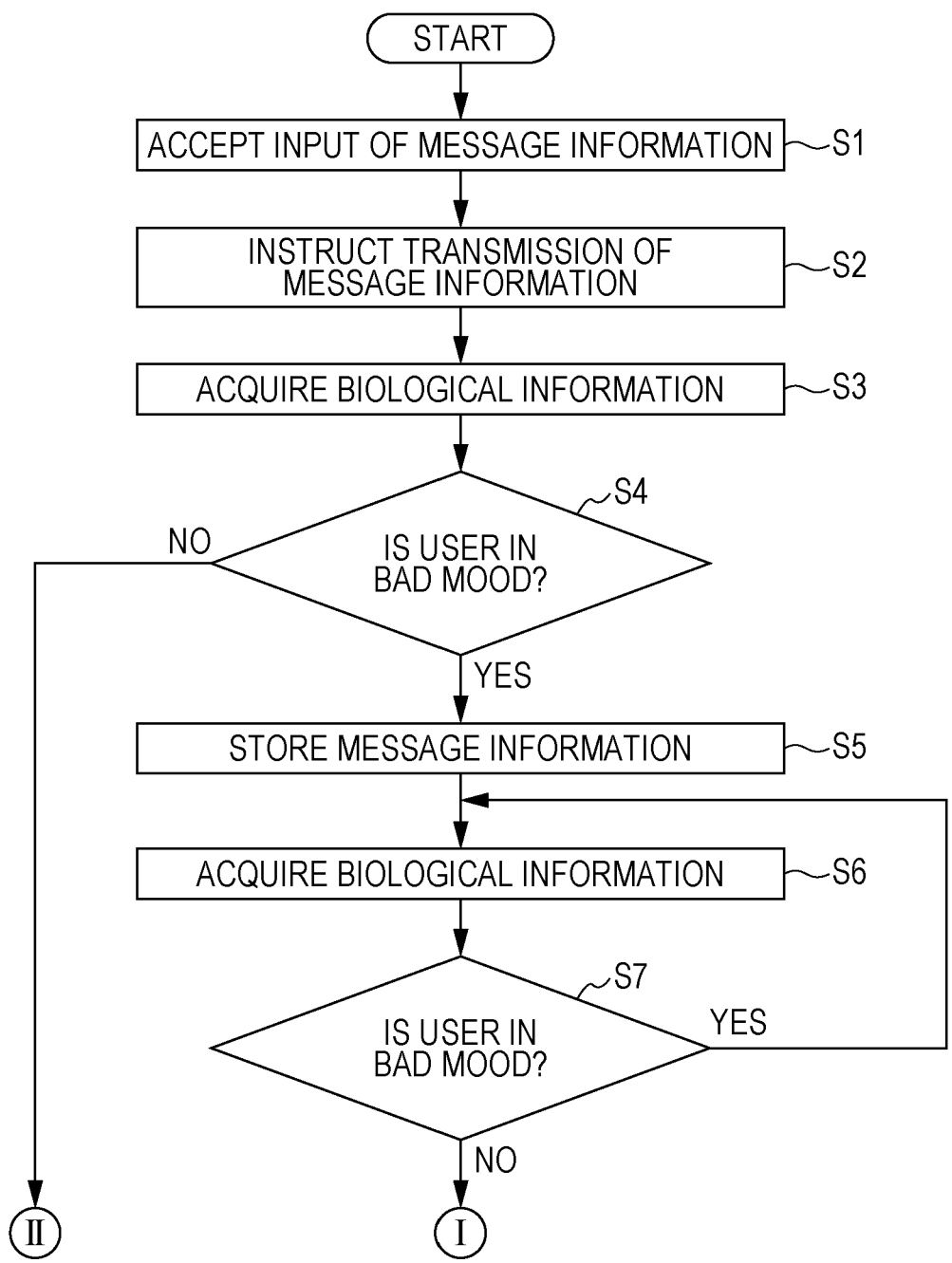
FIG. 3 is a first flowchart for explaining an operation of the information communication device according to the first embodiment.
Figure 4:
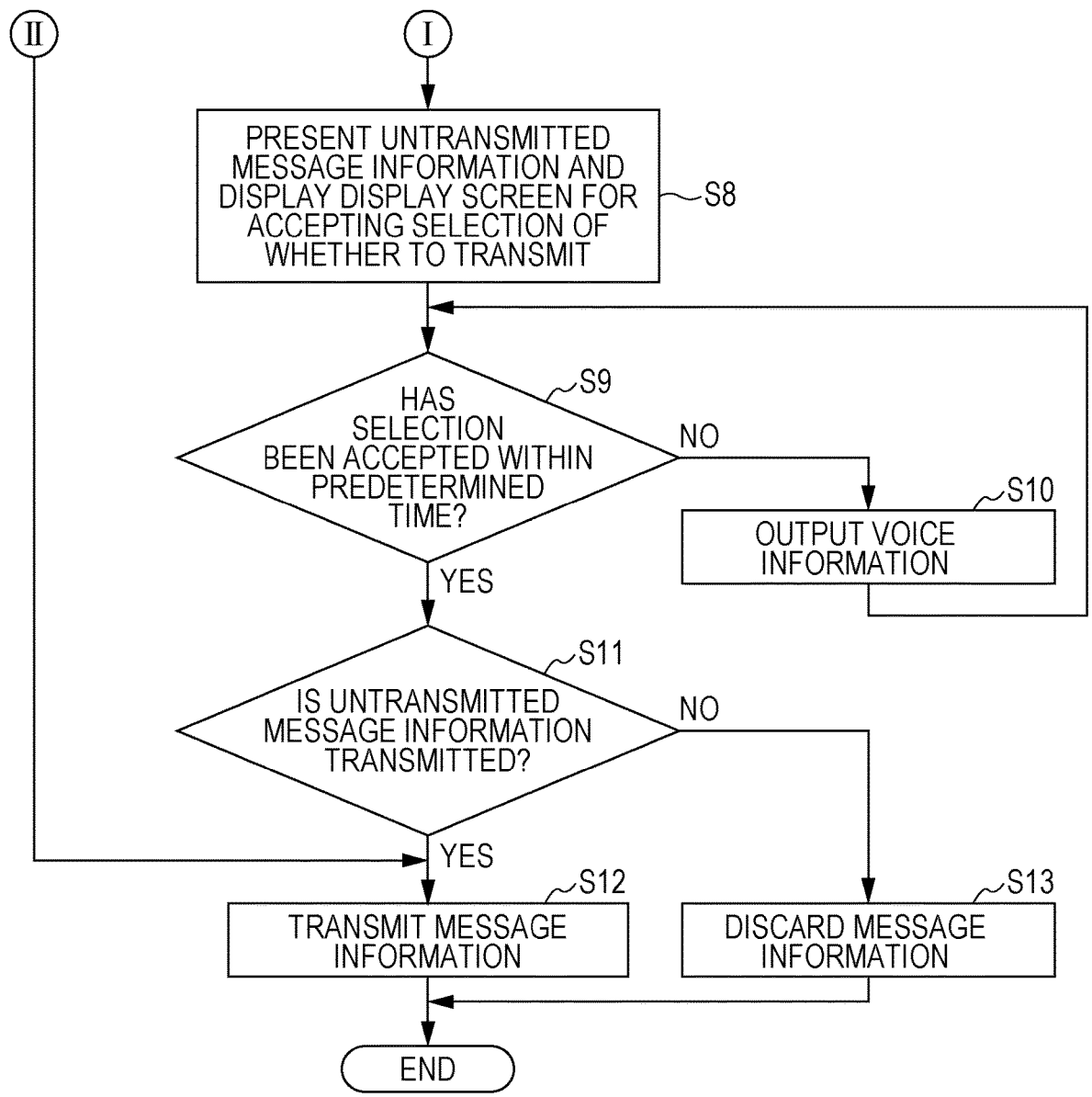
FIG. 4 is a second flowchart for explaining an operation of the information communication device according to the first embodiment.

FIG. 3 is a first flowchart for explaining an operation of the information communication device 1 according to the first embodiment. FIG. 4 is a second flowchart for explaining an operation of the information communication device 1 according to the first embodiment.

First, in step S1, the message input acceptance unit 111 accepts input by the user of message information to be transmitted to the first information communication device.

Figure 5:
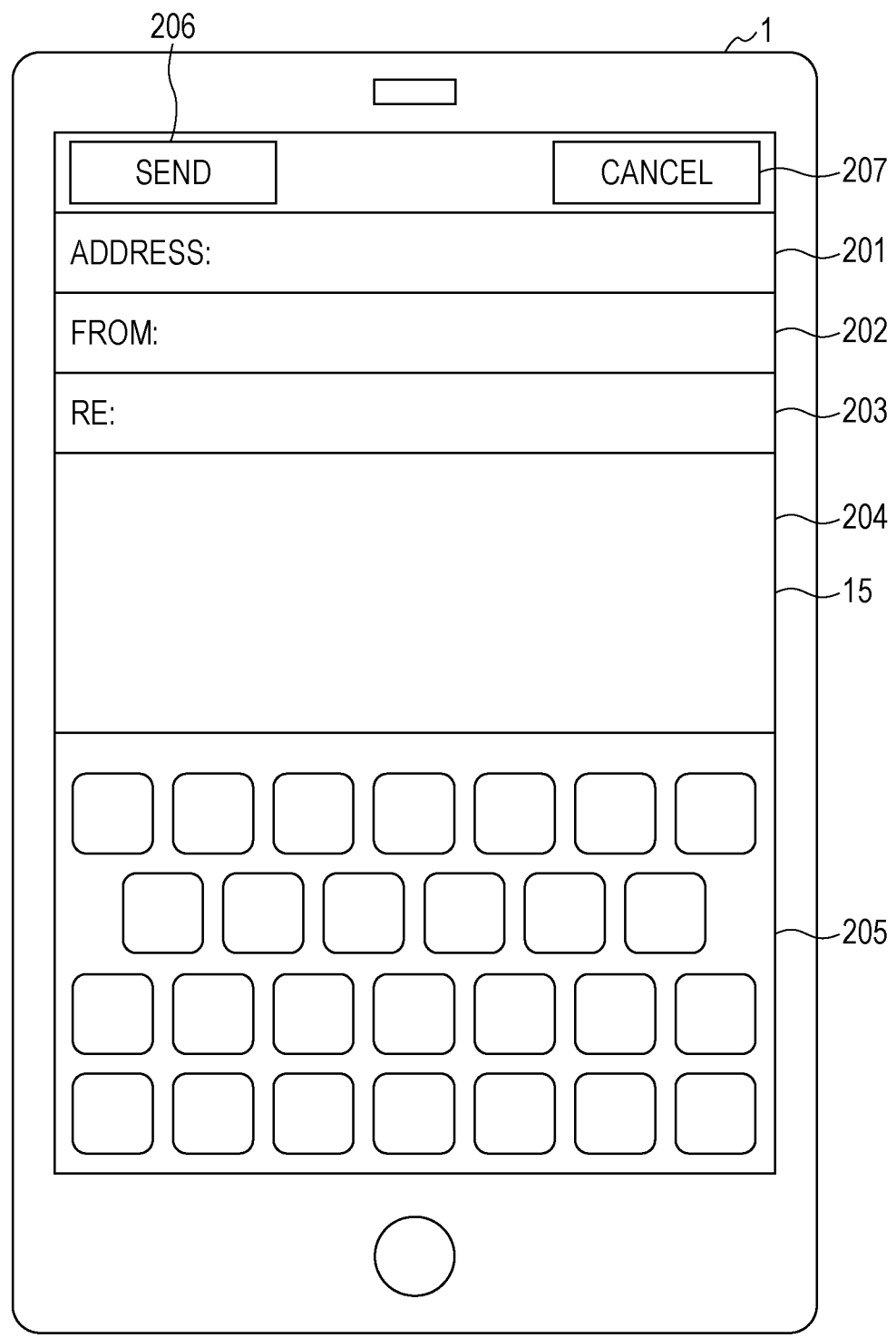
FIG. 5 is a diagram illustrating an example of a display screen displayed when message information is input in the first embodiment.

FIG. 5 is a diagram illustrating an example of a display screen displayed when message information is input in the first embodiment.

The display unit 15 of the information communication device 1 displays a message input screen illustrated in FIG. 5. The message input screen includes an address column 201 for inputting an address to which message information is to be transmitted, a sender column 202 for inputting a sender who transmits the message information, a subject column 203 for inputting a subject of the message information, a main sentence field 204 for inputting a main sentence of message information, a keyboard 205 for inputting characters, a send button 206 for instructing transmission of the message information, and a cancel button 207 for canceling transmission of the message information.

The user inputs the address, the sender, the subject, and the main sentence, and presses the send button 206. As a result, the transmission control unit 124 is instructed to transmit message information to the first information communication terminal where the first information communication terminal corresponds to the address.

Returning to FIG. 3, next, in step S2, the message creation unit 121 instructs the transmission control unit 124 to transmit the accepted message information. In the message input screen illustrated in FIG. 5, in a case where the send button 206 is pressed by the user, the message creation unit 121 instructs the transmission control unit 124 to transmit the accepted message information.

Next, in step S3, the biological information acquisition unit 122 acquires biological information measured by the biological information measurement unit 10.

Next, in step S4, the mood determination unit 123 determines based on the biological information acquired by the biological information acquisition unit 122 whether the user is in a bad mood. Here, in a case where it is determined that the user is not in a bad mood, that is, in a case where it is determined that the user is in a good mood ("No" in step S4), in step S12, the transmission control unit 124 transmits the accepted message information to the first information communication device.

On the other hand, in a case where it is determined that the user is in a bad mood ("YES" in step S4), in step S5, the transmission control unit 124 stops transmitting the created message information, and the created message information is stored in the untransmitted message storage unit 131.

Next, in step S6, the biological information acquisition unit 122 acquires new biological information measured by the biological information measurement unit 10.

Next, in step S7, the mood determination unit 123 determines based on the new biological information acquired by the biological information acquisition unit 122 whether the user is in a bad mood. Here, in a case where it is determined that the user is in a bad mood ("YES" in step S7), the process returns to step S6. The process from step S6 to step S7 is repeated until it is determined that the user is not in a bad mood.

On the other hand, in a case where it is determined that the user is not in a bad mood, that is, in a case where it is determined based on new biological information that the user is in a good mood ("No" in step S7), in step S8, the transmission confirmation processing unit 125 presents to the user untransmitted message information stored in the untransmitted message storage unit 131, and displays on the display unit 15 a display screen for accepting selection by the user of whether to transmit the untransmitted message information. The message transmission acceptance unit 112 accepts on the display screen selection by the user of whether to transmit the untransmitted message information.

Figure 6:
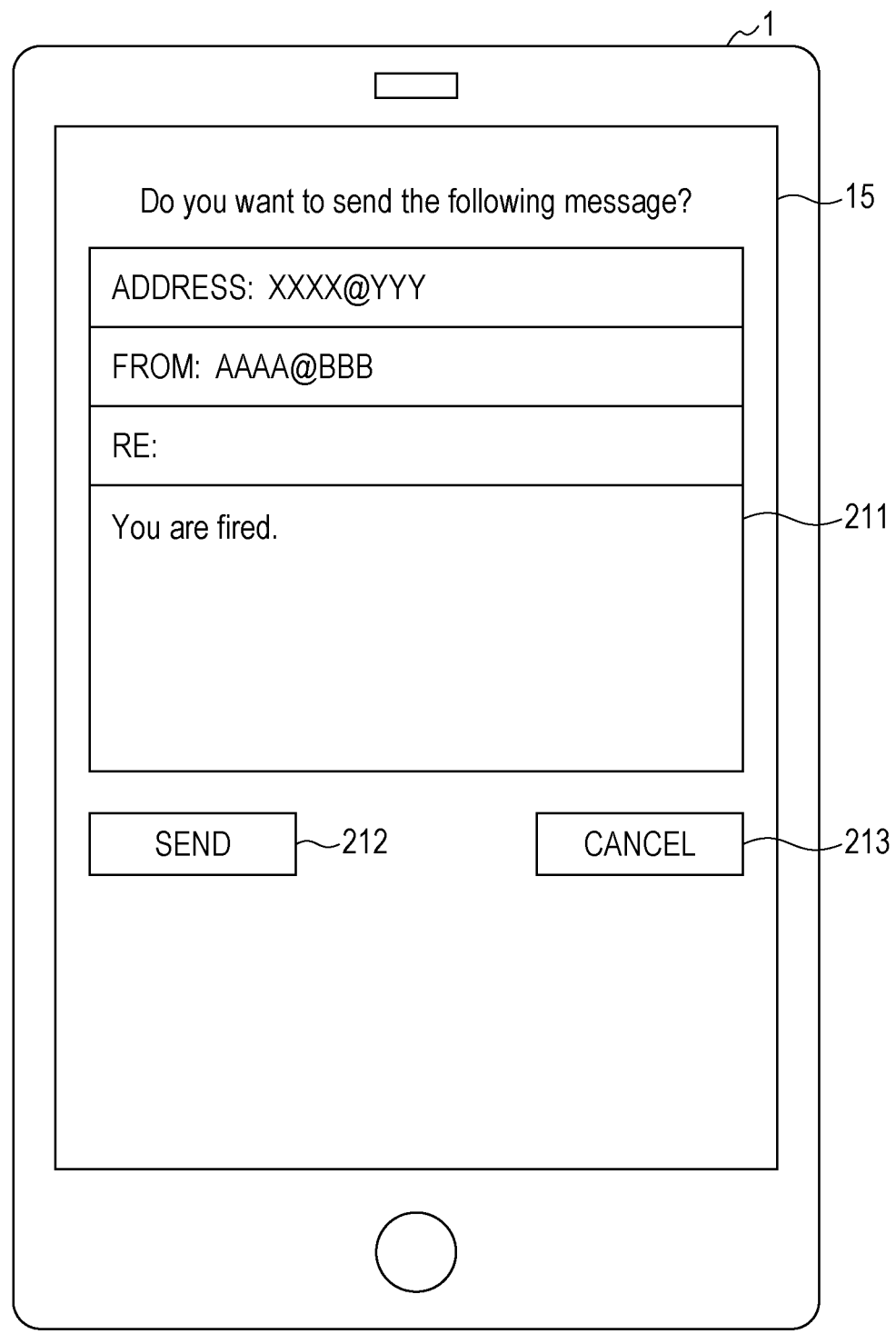
FIG. 6 is a diagram illustrating an example of a display screen displayed when selection of whether to transmit untransmitted message information is performed in the first embodiment.

FIG. 6 is a diagram illustrating an example of a display screen displayed when selection of whether to transmit untransmitted message information is performed in the first embodiment.

In a case where it is determined that the user is in a good mood after it is determined that the user is in a bad mood, the display unit 15 of the information communication device 1 displays a transmission confirmation screen illustrated in FIG. 6. The transmission confirmation screen includes untransmitted message information 211, a send button 212 for instructing transmission of message information, and a cancel button 213 for canceling transmission of message information.

In the message information 211 illustrated in FIG. 6, the main sentence stating that "You are fired", which is input when the user is in a bad mood, is displayed. When transmitting this message information 211, the user presses the send button 212. When not transmitting this message information 211, the user presses the cancel button 213.

Returning to FIG. 4, next, in step S9, the transmission control unit 124 determines whether selection by the user has been accepted within a predetermined time. Here, in a case where it is determined that selection by the user has not been accepted within the predetermined time ("No" in step S9), in step S10, the transmission confirmation processing unit 125 outputs to the voice output unit 16 voice information prompting the user to select whether to transmit message information that has not been transmitted. The voice output unit 16 outputs the voice information that has been input from the transmission confirmation processing unit 125. Then, the process returns to step S9. Thus, for example, it is possible to notify, by voice, the user who cannot see the display screen of whether to transmit message information that has not been transmitted.

On the other hand, in a case where it is determined that selection by the user has been accepted within a predetermined time ("YES" in step S9), In step S11, the transmission control unit 124 determines whether to transmit the untransmitted message information. In a case where pressing of the send button 212 is accepted by the message transmission acceptance unit 112, the transmission control unit 124 determines that the message information is transmitted, and in a case where pressing of the cancel button 213 is accepted by the message transmission acceptance unit 112, the transmission control unit 124 determines that the message information is not transmitted.

Here, in a case where it is determined that message information is transmitted ("YES" in step S11), in step S12, the transmission control unit 124 transmits to the first information communication terminal the untransmitted message information stored in the untransmitted message storage unit 131 where the first information communication terminal is different from the second information communication terminal used by a user.

On the other hand, in a case where it is determined that message information is not transmitted ("No" in step S11), in step S13, the transmission control unit 124 discards the untransmitted message information stored in the untransmitted message storage unit 131.

In this way, the message information created when the user is in a bad mood is not immediately transmitted, but it is determined whether to transmit message information created when the user is in a bad mood when a state that the user is in a bad mood has changed to a state that the user is in a good mood. Thus, it is possible to prevent inappropriate message information which is input when the user is in a bad mood from being transmitted to the first information communication device.

In the first embodiment, in a case where it is determined that the user is in a good mood after it is determined that the user is in a bad mood, the transmission confirmation processing unit 125 presents message information that has not been transmitted, and displays on the display unit 15 a display screen for accepting selection by the user of whether to transmit message information that has not been transmitted. The present disclosure is not limited to the first embodiment. In a case where it is determined that the user is in a good mood after it is determined that the user is in a bad mood, the transmission confirmation processing unit 125 presents, without displaying the display screen, message information that has not been transmitted, and voice information for accepting selection by the user of whether to transmit message information that has not been transmitted may be output to the voice output unit 16. In a case where it is determined that the user is in a good mood after it is determined that the user is in a bad mood, the transmission confirmation processing unit 125 may display the display screen, and voice information may be output to the voice output unit 16.

In the first embodiment, the message information is transmitted using the email transmission technique. The present disclosure is not particularly limited to the first embodiment, and the message information may be transmitted using transmission techniques such as a social networking service (SNS) and chat tool. Furthermore, the present disclosure is not limited to these examples, and can be applied to various applications or services that transmit messages to other users.

Second Embodiment

In the first embodiment, in a case where the user selects not to transmit the message information that has not been transmitted, the message information stored in the untransmitted message storage unit 131 is discarded. In the second embodiment, the correction by the user of the message information stored in the untransmitted message storage unit 131 is accepted.

Figure 7:
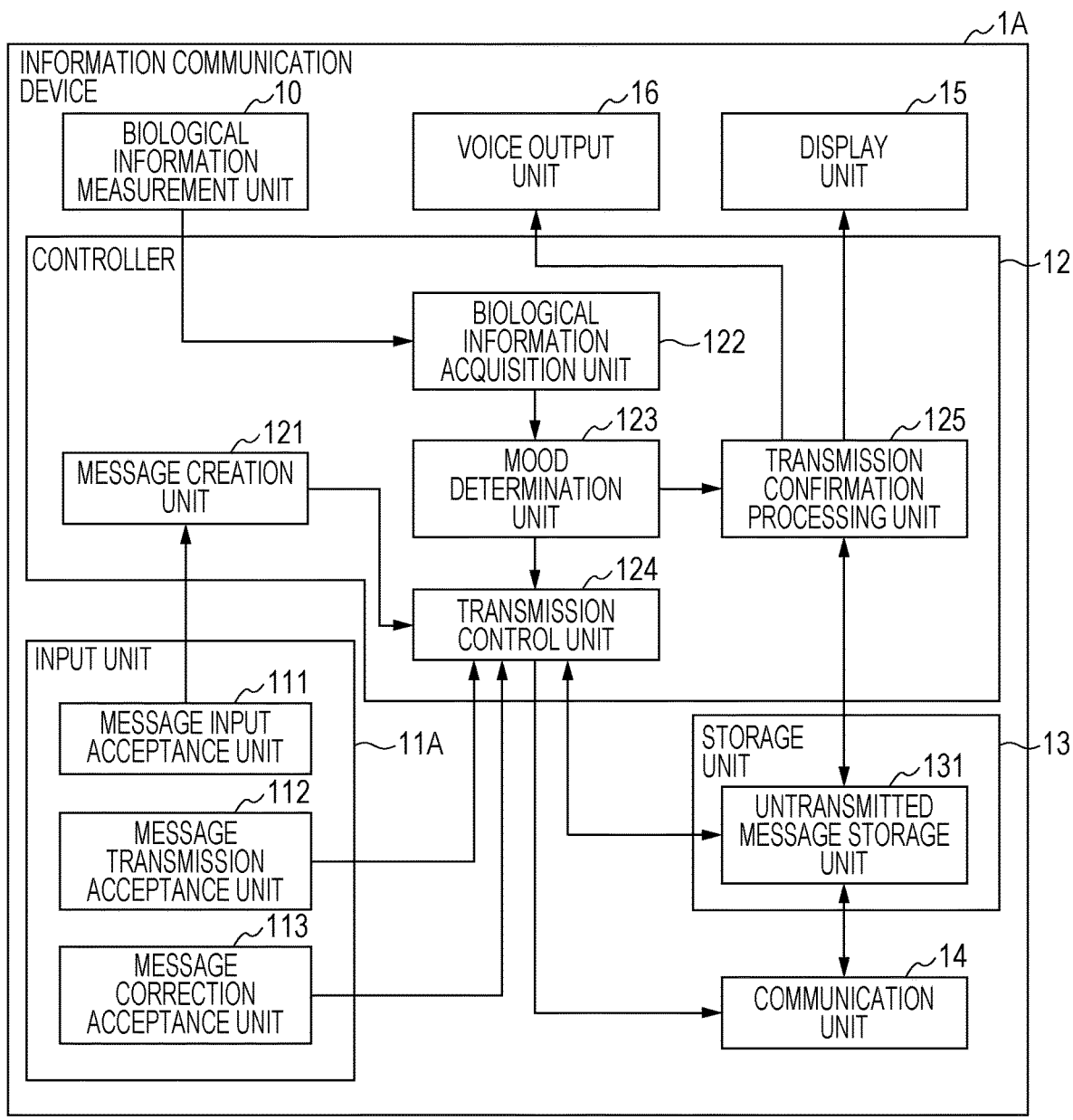
FIG. 7 is a block diagram illustrating an example of a configuration of an information communication device according to a second embodiment of the present disclosure.

FIG. 7 is a block diagram illustrating an example of a configuration of an information communication device according to a second embodiment of the present disclosure. An information communication device 1A is, for example, a smartphone, a tablet computer, or a personal computer.

The information communication device 1A includes the biological information measurement unit 10, an input unit 11A, the controller 12, the storage unit 13, the communication unit 14, the display unit 15, and the voice output unit 16. In the second embodiment, the same reference numerals are given to the same configurations as those in the first embodiment, and a description thereof will be omitted.

The input unit 11A is, for example, a touch panel display, a keyboard or a mouse, and accepts various input operations performed by the user. The input unit 11A includes the message input acceptance unit 111, the message transmission acceptance unit 112, and a message correction acceptance unit 113.

The message correction acceptance unit 113 accepts the correction by the user of the message information stored in the untransmitted message storage unit 131.

The transmission control unit 124 transmits the message information corrected by the message correction acceptance unit 113.

Next, the operation of the information communication device 1A according to the second embodiment will be described.

Figure 8:
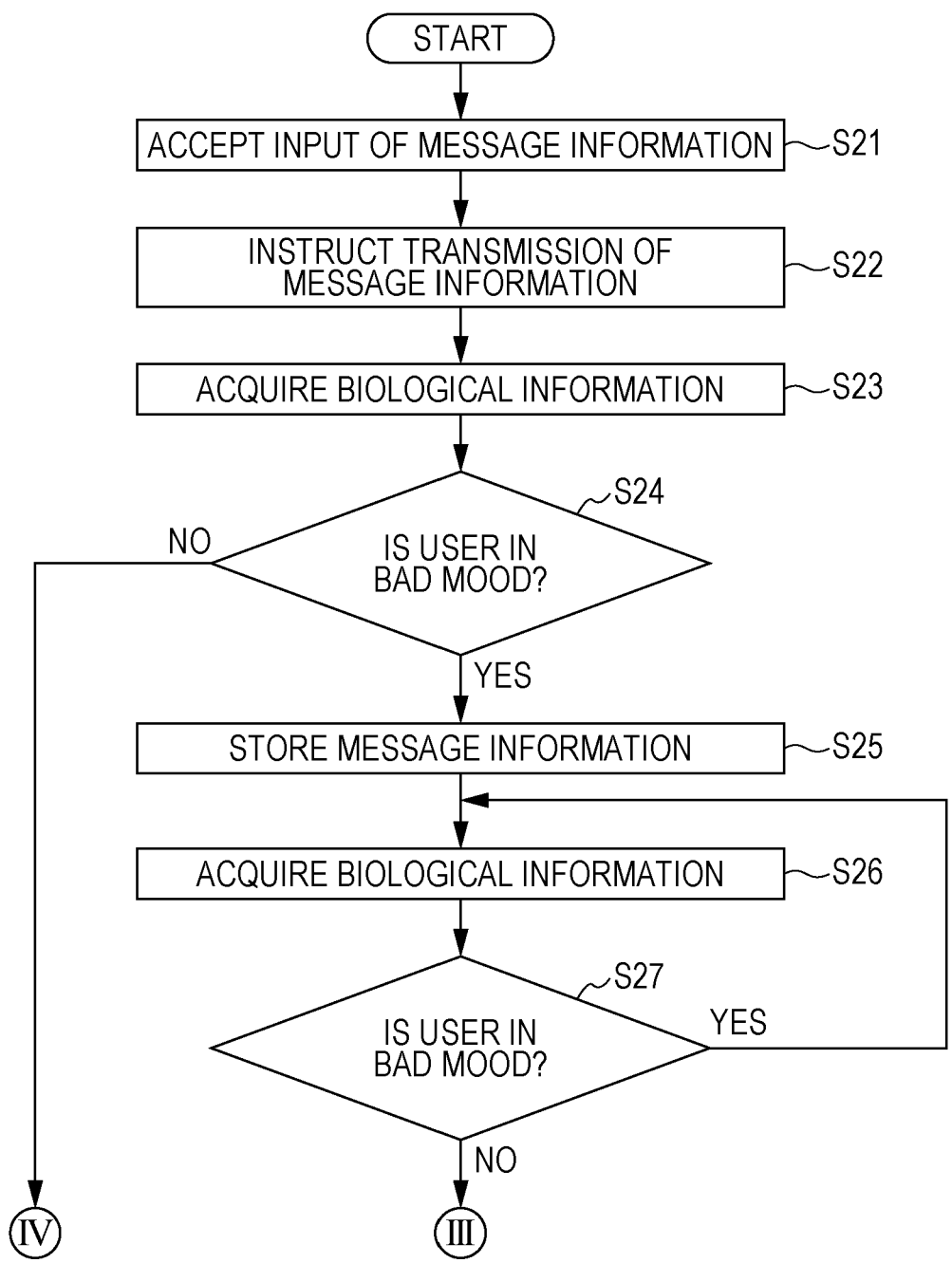
FIG. 8 is a first flowchart for explaining an operation of the information communication device according to the second embodiment.
Figure 9:
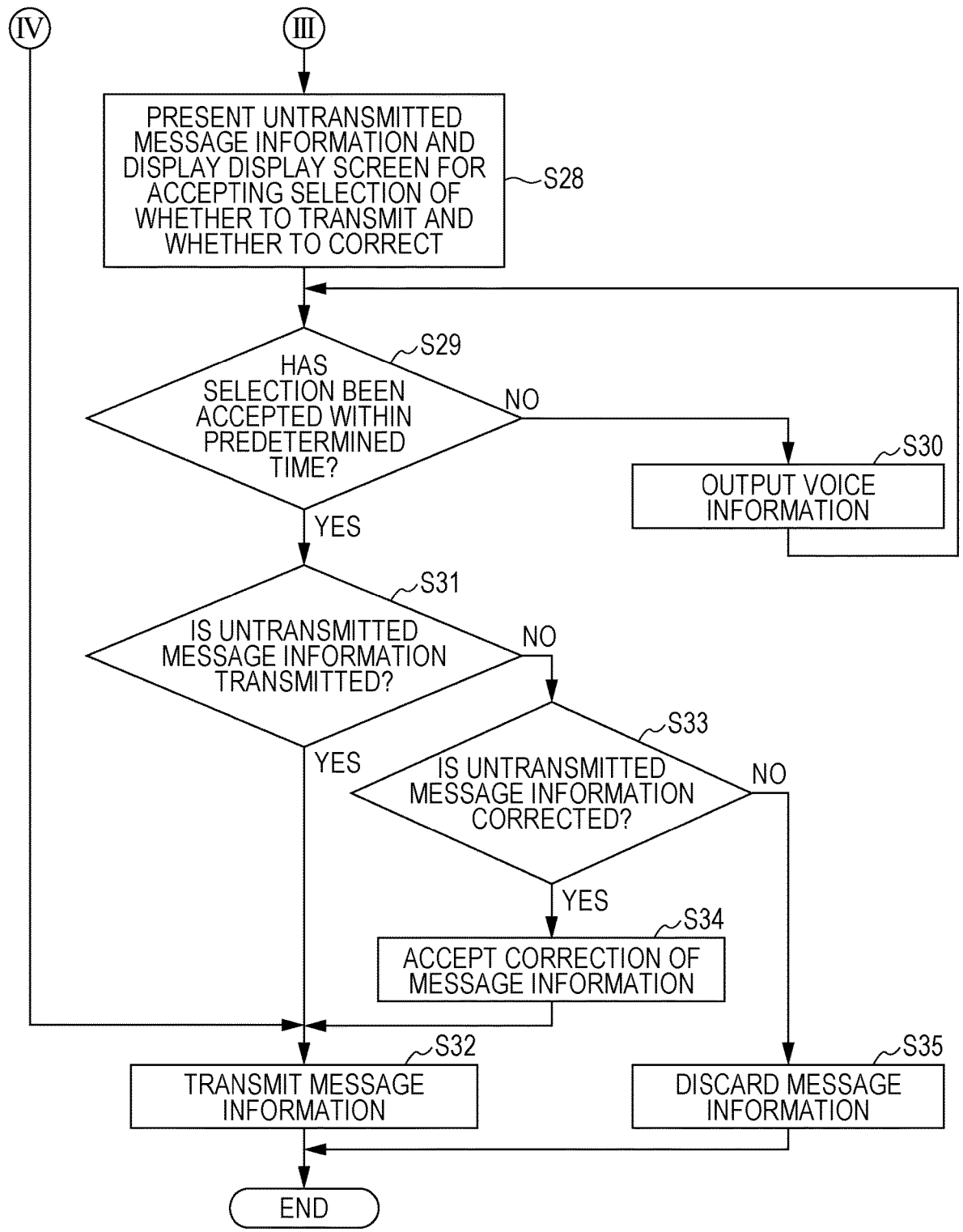
FIG. 9 is a second flowchart for explaining an operation of the information communication device according to the second embodiment.

FIG. 8 is a first flowchart for explaining an operation of the information communication device 1A according to the second embodiment. FIG. 9 is a second flowchart for explaining an operation of the information communication device 1A according to the second embodiment.

Note that since the process of steps S21 to S27 is the same as the process of steps S1 to S7 illustrated in FIG. 3, the description thereof will be omitted.

In a case where it is determined in step S27 that the user is not in a bad mood, that is, in a case where it is determined that the user is in a good mood ("No" in step S27), in step S28, the transmission confirmation processing unit 125 presents to the user the untransmitted message information stored in the untransmitted message storage unit 131, and displays on the display unit 15 a display screen for accepting selection by the user of whether to transmit the untransmitted message information, and whether to correct the untransmitted message information. The message transmission acceptance unit 112 accepts on the display screen selection by the user of whether to transmit the untransmitted message information, and whether to correct the untransmitted message information.

Figure 10:
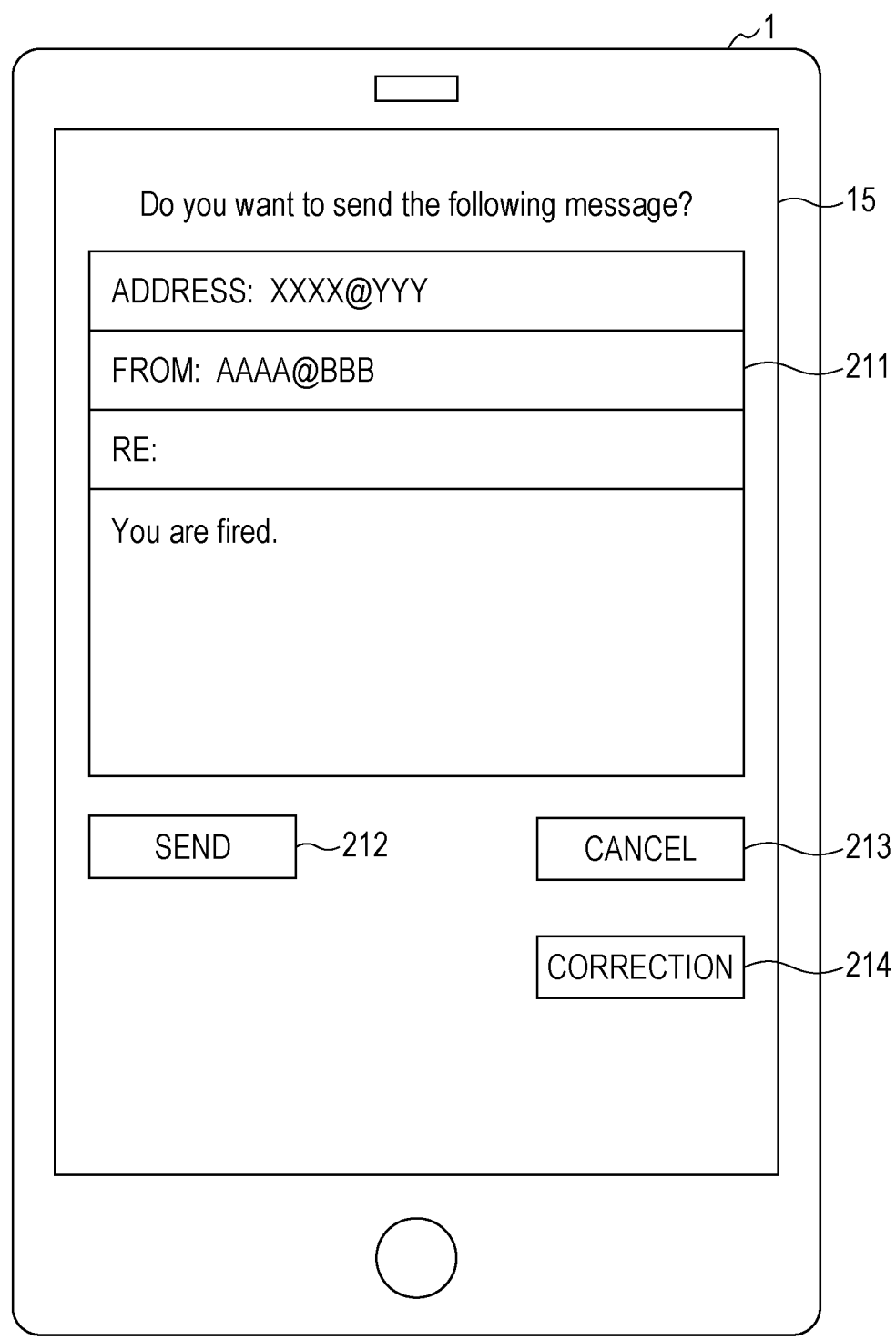
FIG. 10 is a diagram illustrating an example of a display screen displayed when whether to transmit untransmitted message information is selected, and when whether to correct untransmitted message information is selected in the second embodiment.

FIG. 10 is a diagram illustrating an example of a display screen displayed when whether to transmit untransmitted message information is selected, and when whether to correct untransmitted message information is selected in the second embodiment.

In a case where it is determined that the user is in a good mood after it is determined that the user is in a bad mood, the display unit 15 of the information communication device 1A displays the transmission confirmation screen illustrated in FIG. 10. The transmission confirmation screen includes the untransmitted message information 211, the send button 212 for instructing transmission of message information the cancel button 213 for canceling transmission of message information, and a correction button 214 for accepting correction of message information.

In the message information 211 illustrated in FIG. 10, the main sentence stating that "You are fired", which is input when the user is in a bad mood, is displayed. When transmitting this message information 211, the user presses the send button 212. When not transmitting this message information 211, the user presses the cancel button 213. Further, in a case where correcting this message information 211, the user presses the correction button 214.

In a case where the correction button 214 is pressed, the display unit 15 displays a correction acceptance screen for accepting correction by the user of the untransmitted message information.

Figure 11:
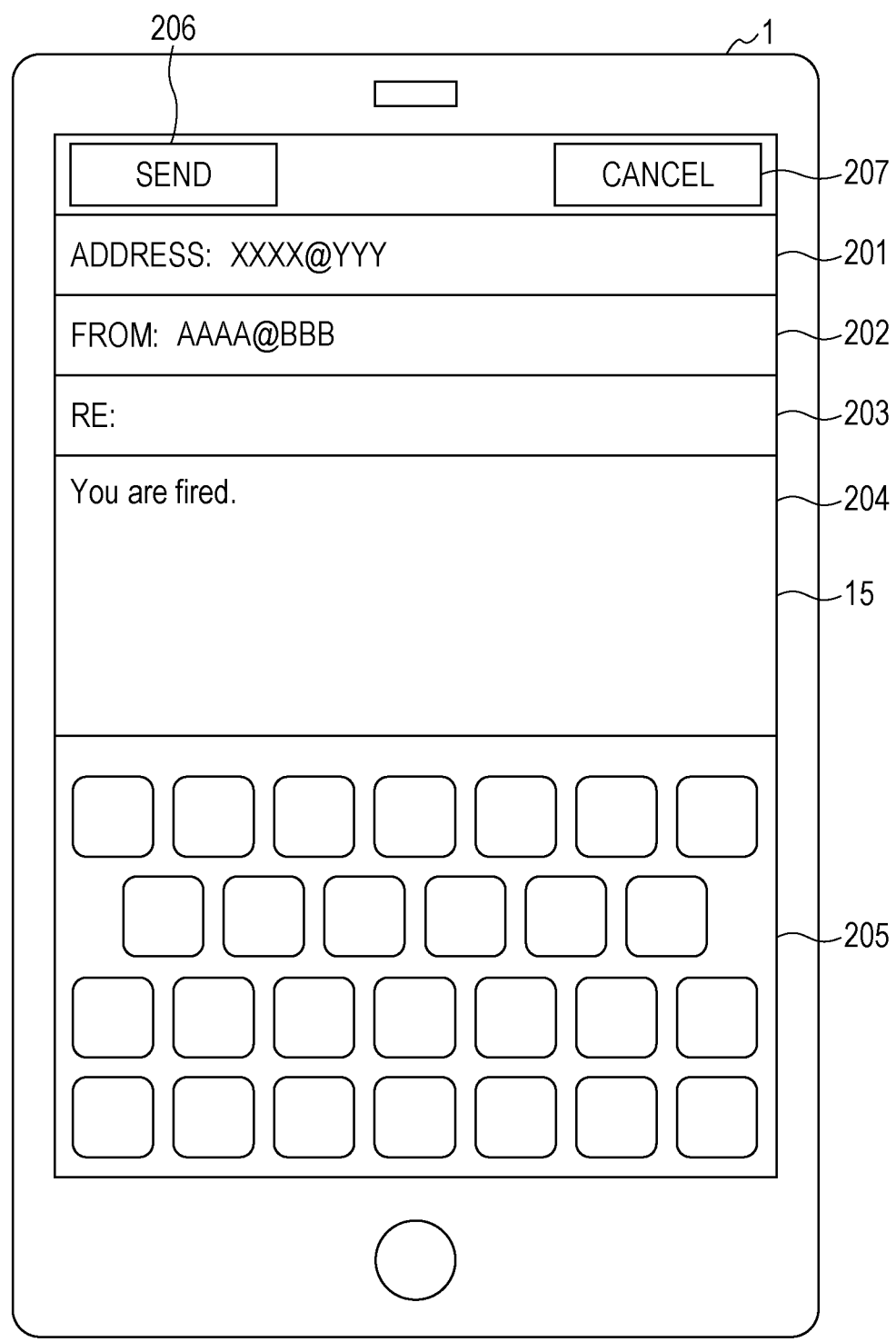
FIG. 11 is a diagram illustrating an example of a display screen displayed when untransmitted message information is corrected in the second embodiment.

FIG. 11 is a diagram illustrating an example of a display screen displayed when untransmitted message information is corrected in the second embodiment.

In a case where the correction button 214 is pressed, the display unit 15 displays the correction acceptance screen illustrated in FIG. 11. The correction acceptance screen includes the address column 201 for inputting an address to which message information is to be transmitted, the sender column 202 for inputting a sender who transmits message information, the subject column 203 for inputting a subject of message information, the main sentence field 204 for inputting a main sentence of message information, the keyboard 205 for inputting characters, the send button 206 for instructing transmission of message information, and the cancel button 207 for canceling transmission of message information.

The transmission confirmation processing unit 125 reads the untransmitted message information from the untransmitted message storage unit 131, and displays the untransmitted message information on the correction acceptance screen of the display unit 15. An address, a sender, a subject, and a main sentence before correction are displayed in the address column 201, the sender column 202, the subject column 203 and the main sentence field 204, respectively.

Since the process of steps S29 to S32 is the same as the process of steps S9 to S12 illustrated in FIG. 4, the description thereof will be omitted.

In a case where it is determined in step S31 that the untransmitted message information is not transmitted ("No" in step S31), in step S33, the transmission control unit 124 determines whether to correct the untransmitted message information. In a case where pressing of the correction button 214 is accepted by the message correction acceptance unit 113, the transmission control unit 124 determines that the message information is corrected, and in a case where pressing of the cancel button 213 is accepted by the message transmission acceptance unit 112, the transmission control unit 124 determines that the message information is not transmitted.

In a case where it is determined that the untransmitted message information is corrected ("YES" in step S33), in step S34, the message correction acceptance unit 113 accepts the correction by the user of the untransmitted message information. The message correction acceptance unit 113 accepts corrections by the user of the address column 201, the sender column 202, the subject column 203, and the main sentence field 204. The user corrects the address, the sender, the subject, and the main sentence, and presses the send button 206. As a result, the transmission control unit 124 transmits the message information to the first information communication terminal where the first information communication terminal corresponds to the address.

On the other hand, in a case where it is determined that the untransmitted message information is not corrected ("No" in step S33), in step S35, the transmission control unit 124 discards the untransmitted message information stored in the untransmitted message storage unit 131.

In this way, in a case where it is determined that the untransmitted message information created when the user is in a bad mood is not transmitted, since the untransmitted message information is not discarded, but the correction of the untransmitted message information is accepted, it is possible to ease the burden of the user re-entering the message information.

Third Embodiment

In the first embodiment, in a case where it is determined that the user is in a bad mood, transmitting the accepted message information is stopped, and the message information that has not been transmitted is stored in the storage unit 13. In the third embodiment, it is determined whether predetermined wording is included in the accepted message information. In a case where it is determined that the predetermined wording is included in the accepted message information, the accepted message information is transmitted.

Figure 12:
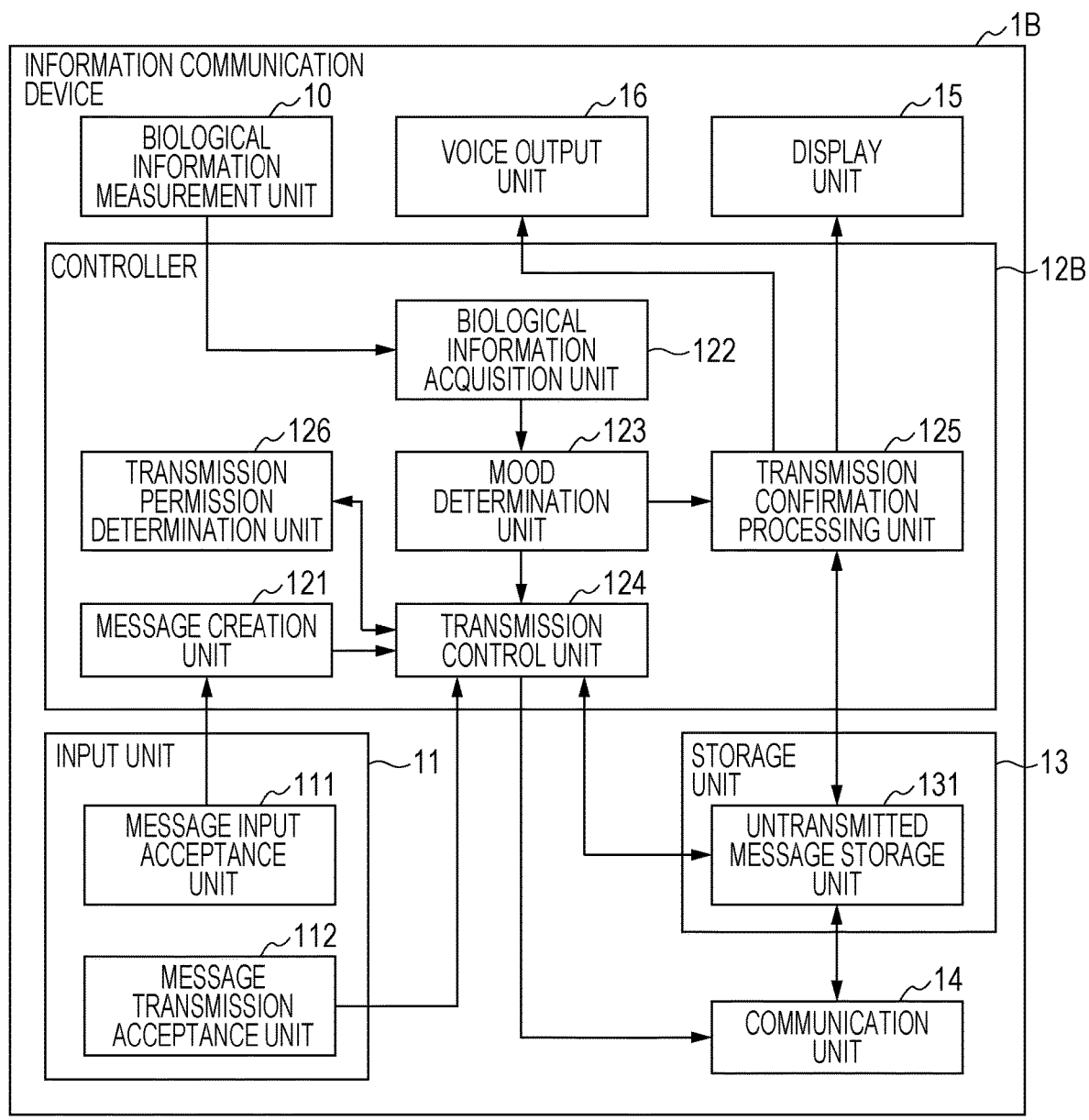
FIG. 12 is a block diagram illustrating an example of a configuration of an information communication device according to a third embodiment of the present disclosure.

FIG. 12 is a block diagram illustrating an example of a configuration of an information communication device according to a third embodiment of the present disclosure. An information communication device 1B is, for example, a smartphone, a tablet computer, or a personal computer.

The information communication device 1B includes the biological information measurement unit 10, the input unit 11, a controller 12B, the storage unit 13, the communication unit 14, the display unit 15, and the voice output unit 16. In the third embodiment, the same reference numerals are given to the same configurations as those in the first embodiment, and a description thereof will be omitted.

The controller 12B is, for example, a CPU, and controls the entire information communication device 1B. The controller 12 includes the message creation unit 121, the biological information acquisition unit 122, the mood determination unit 123, the transmission control unit 124, the transmission confirmation processing unit 125, and a transmission permission determination unit 126.

In a case where the mood determination unit 123 determines that the user is in a bad mood, the transmission permission determination unit 126 determines whether predetermined wording is included in the accepted message information. The predetermined wording is, for example, a word indicating the date and time. For example, in a case where the content of the message information created when the user is in a bad mood is related to the content of adjusting the schedule as in the sentence stating that "Tomorrow's meeting is from 10 o'clock.", there is no inconvenience even if the message information is transmitted. Thus, the transmission permission determination unit 126 determines whether a word indicating the date and time such as "tomorrow" and "10 o'clock" is included in the accepted message information. Note that the predetermined wording is stored in advance in the storage unit 13. In addition, the predetermined wording is not limited to the word indicating the date and time.

In a case where the transmission permission determination unit 126 determines that predetermined wording is included in the message information, the transmission control unit 124 transmits the accepted message information.

Examples of the accepted message information to be transmitted includes, in addition to adjusting the schedule as described above, guiding the schedule, ensuring whether goods or information is included, responding to a questionnaire, a resume or various applications (in particular, having a regular format), or simple informative matter. The information can include the content having no problem to transmit since the content does not depend on the state of the mood of the user. In this case, it is determined whether the accepted message information includes predetermined wording such that the accepted message information does not depend on the mood of the user and has no problem to transmit.

Next, the operation of the information communication device 1B according to the third embodiment will be described.

Figure 13:
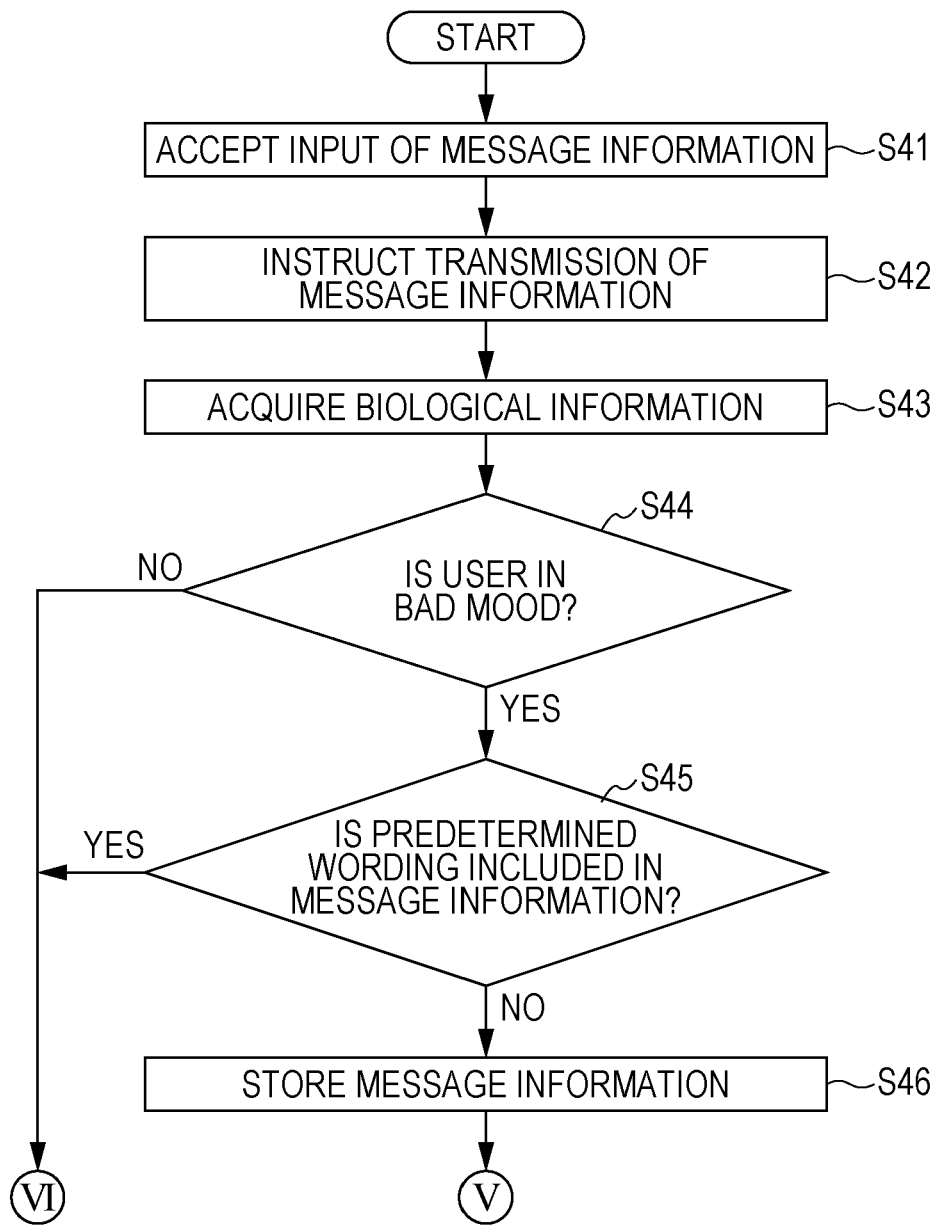
FIG. 13 is a first flowchart for explaining an operation of the information communication device according to the third embodiment.
Figure 14:
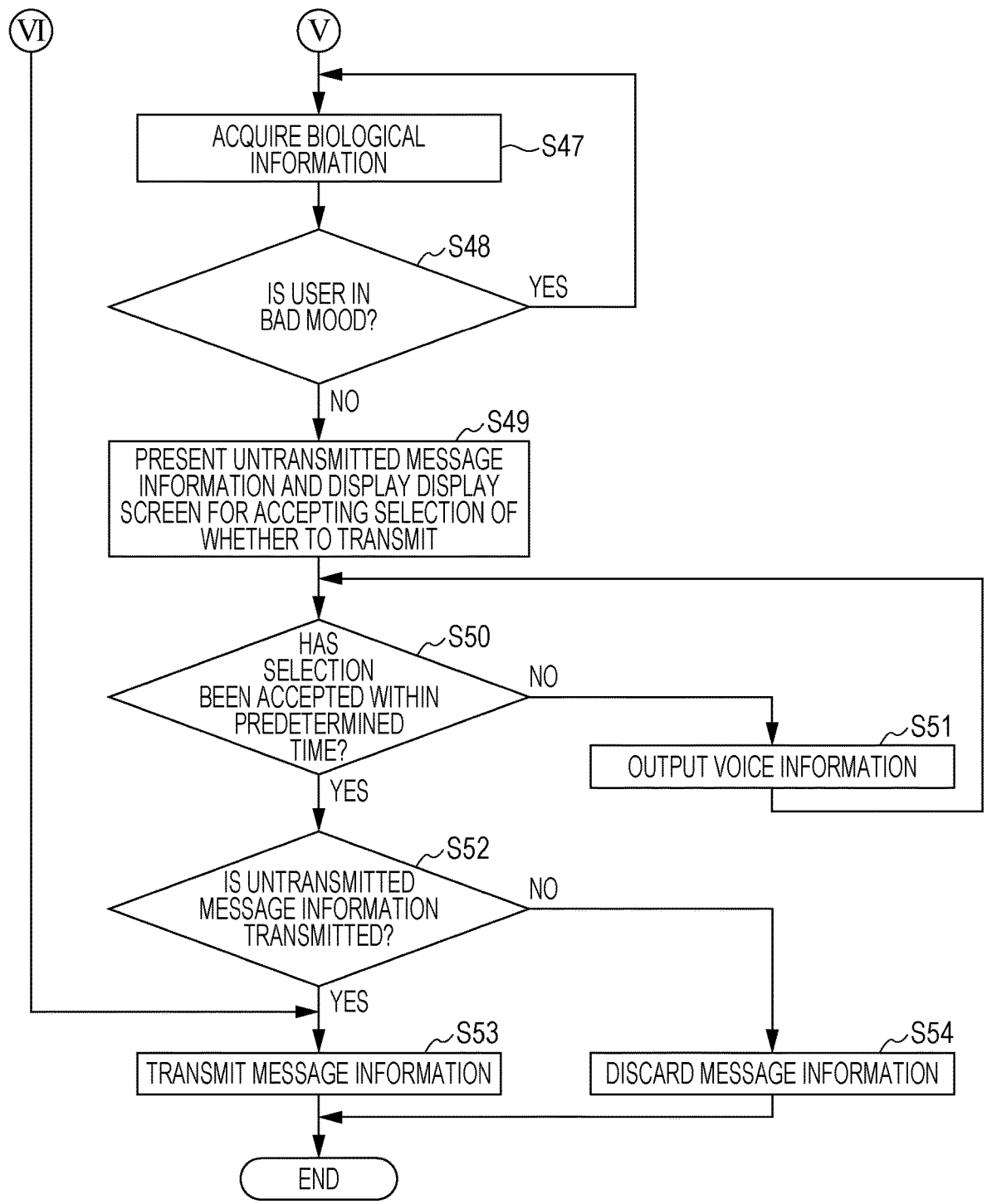
FIG. 14 is a second flowchart for explaining an operation of the information communication device according to the third embodiment.

FIG. 13 is a first flowchart for explaining an operation of the information communication device 1B according to the third embodiment. FIG. 14 is a second flowchart for explaining an operation of the information communication device 1B according to the third embodiment.

Note that since the process of steps S41 to S44 is the same as the process of steps S1 to S4 illustrated in FIG. 3, the description thereof will be omitted.

In a case where it is determined in step S44 that the user is in a bad mood ("YES" in step S44), in step S45, the transmission permission determination unit 126 determines whether predetermined wording is included in the accepted message information. Here, in a case where it is determined that the predetermined wording is included in the accepted message information ("YES" in step S45), in step S53, the transmission control unit 124 transmits the accepted message information to the first information communication terminal.

On the other hand, in a case where it is determined that the predetermined wording is not included in the accepted message information ("No" in step S45), in step S46, the transmission control unit 124 stops transmitting the created message information, and the created message information is stored in the untransmitted message storage unit 131.

Note that since the process of steps S47 to S54 is the same as the process of steps S6 to S13 illustrated in FIGS. 3 and 4, the description thereof will be omitted.

As described above, even if message information is created when the user is in a bad mood, the message information is transmitted in a case where the message information includes predetermined wording, so that it is not necessary to verify whether to transmit the message information when the user becomes in a good mood, and the unnecessary verification process can be omitted.

In the third embodiment, it is determined whether predetermined wording is included in the accepted message information in a case where it is determined that the user is in a bad mood. In a case where it is determined that the predetermined wording is included in the accepted message information, the accepted message information is transmitted. The present disclosure is not particularly limited to the third embodiment. It may be determined whether predetermined wording is not included in the accepted message information in a case where it is determined that the user is in a bad mood. In a case where it is determined that the predetermined wording is not included in the accepted message information, the accepted message information may be transmitted.

For example, it may be determined whether the message information includes a word that intimidates a person who receives the email, a word that insults the person, a word that slanders the person, a word that makes the person feel displeasure, or a word that indicates personal information. In a case where such a word is included in the message information, the message information may not be transmitted, and in a case where such a word is not included in the message information, the message information may be transmitted.

In the first to third embodiments, the transmission confirmation processing unit 125 determines whether predetermined wording is included in the message information that has not been transmitted. In a case where it is determined that the predetermined wording is included in the message information that has not been transmitted, the predetermined wording included in the message information may be displayed in a form different from that of the other words. The predetermined word is a word that intimidates the person who receives the email, a word that insults the person, a word that slanders the person, a word that makes the person feel displeasure, or a word that indicates personal information. The predetermined word is stored in advance in the storage unit 13.

Figure 15:
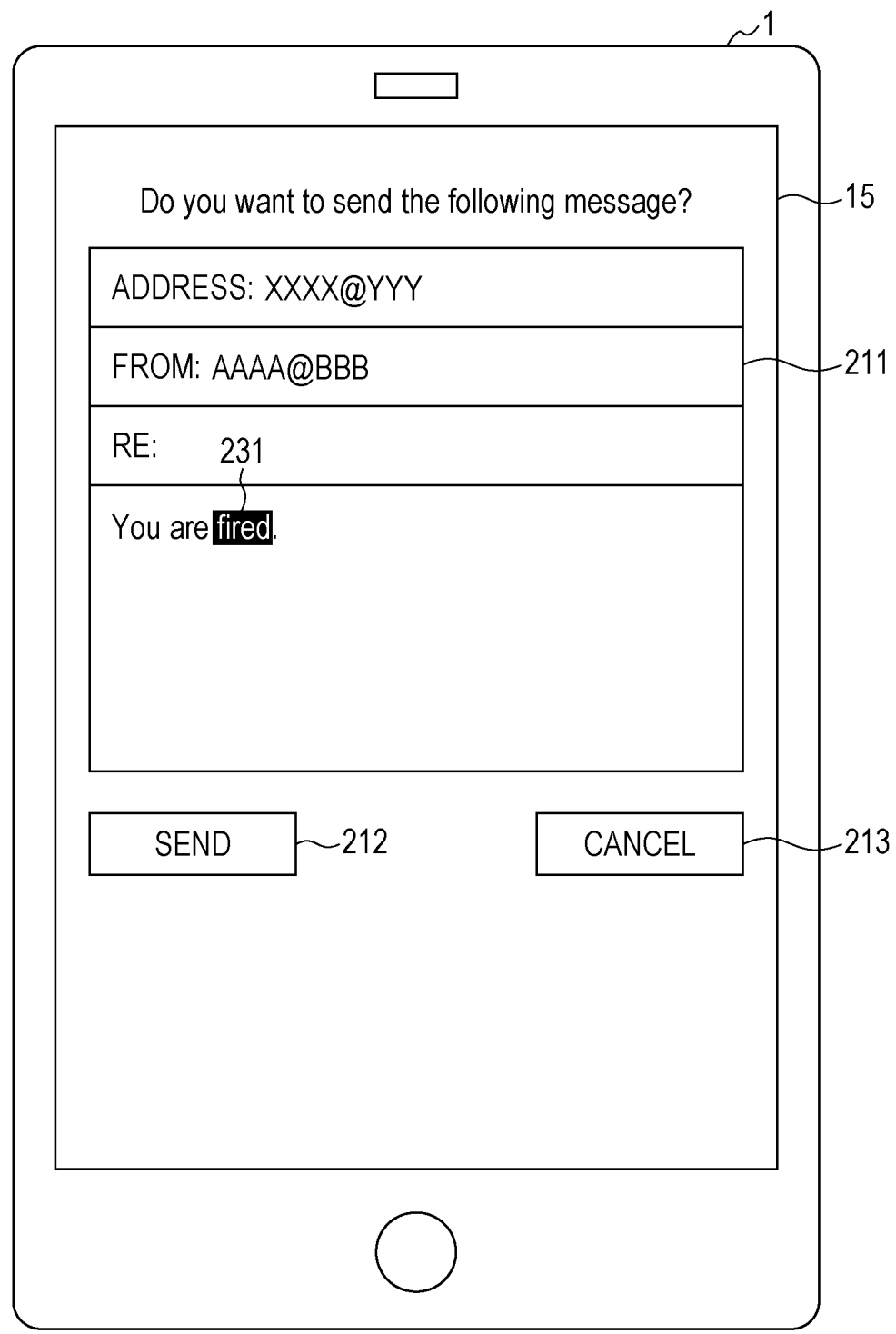
FIG. 15 is a diagram illustrating an example of a display screen displayed when selection of whether to transmit untransmitted message information is performed in the first to third embodiments.

FIG. 15 is a diagram illustrating an example of a display screen displayed when selection of whether to transmit untransmitted message information is performed in the first to third embodiments.

In the message information 211 illustrated in FIG. 15, the main sentence stating that "You are fired", which is input when the user is in a bad mood, is displayed. At this time, the message information that has not been transmitted includes predetermined wording of "fired". Thus, the transmission confirmation processing unit 125 determines that the predetermined wording is included in the message information that has not been transmitted, and displays a portion 231 of the predetermined wording included in the message information in a form different from that of the other words. In FIG. 15, the color of the characters of the portion 231 of the predetermined wording and the color of the background are reversely displayed. Note that the color of the portion 231 of the predetermined wording may be different from the color of the other words, and the size of the portion 231 of the predetermined wording may be different from the size of the other words.

In addition, in a case where the transmission confirmation processing unit 125 determines that the predetermined wording is included in the message information that has not been transmitted, the transmission confirmation processing unit 125 may notify, by voice, the user of the predetermined wording included in the message information. For example, in a case where predetermined wording of "fired" is included in the message information that has not been transmitted, the transmission confirmation processing unit 125 may output, to the voice output unit 16, voice information stating that "Are you sure to use the expression, "fired"?".

In addition, the user may use a voice to determine whether to transmit the untransmitted message information. In this case, the information communication device includes a microphone for collecting a voice and a voice recognition unit for recognizing the voice collected by the microphone.

Although the device of the present disclosure has been described on the basis of the embodiments above, the present disclosure is not limited to these embodiments. Without departing from the spirit of the present disclosure, various modifications that occur to those skilled in the art or that has been subjected to these embodiments and the form that is constructed by combining the components in different embodiments may be also included in a range of one or more aspects of the present disclosure.

Further, in the foregoing embodiments, each component may be configured by dedicated hardware, or it may be realized by executing a software program suitable for the structural element. Each component may be realized by the program executing unit such as a CPU or a processor reading and executing the software program recorded on a recording medium such as a hard disk or a semiconductor memory.

Part or all of the functions of the device according to the embodiments of the present disclosure are typically implemented as a Large Scale Integration (LSI) constituted by an integrated circuit. These may be implemented individually as single chips, or may be integrated into one chip including some or all of them. In addition, circuit integration is not limited to LSI, and may be realized by a dedicated circuit or a general-purpose processor. A Field Programmable Gate Array (FPGA) that can be programmed after LSI manufacturing, or a reconfigurable processor where connections and settings of circuit cells within the LSI can be restructured may be used.

In addition, part or all of the functions of the device according to the embodiment of the present disclosure may be implemented by a processor such as a CPU executing a program.

In addition, the numerals used above are all exemplified for specifically explaining the present disclosure, and the present disclosure is not limited to the exemplified numerals.

In addition, the order in which the steps shown in the flowcharts is performed is illustrative to explain the present disclosure specifically, and it may be an order other than the above as long as the similar effects are obtained. In addition, some of the steps may be performed in other steps simultaneously (in parallel).

Without departing from the spirit of the present disclosure, various modifications wherein the modifications occur to those skilled in the art with respect to each embodiment of the present disclosure and are implemented are included in the present disclosure.

The information processing method, the information communication device, and the information processing program according to the present disclosure can prevent message information which is input when the user is in a bad mood from being transmitted to the first information communication device, and the present disclosure is useful as an information processing method for transmitting message information to the first information communication device, an information communication device, and a recording medium storing an information processing program.

What is claimed is:

1. An information processing method comprising:
   acquiring, by a processor of a transmitting information processing device used by a first user, biological information of the first user;
   accepting, by the processor, an input to the transmitting information processing device by the first user of a message to be transmitted from the transmitting information processing device to a receiving information processing device that is used by a second user and is different from the transmitting information processing device used by the first user;
   determining, by the processor, based on the biological information of the first user using the transmitting information processing device, whether the first user is in a bad mood; and
   in response to determining that the first user using the transmitting information processing device is in a bad mood, stopping, by the processor, transmission of the accepted message from the transmitting information processing device to the receiving information processing device, and storing, by the processor, the accepted message in a memory, that has not been transmitted.

2. The information processing method according to claim 1, further comprising:
   acquiring new biological information of the first user of the transmitting information processing device after it is determined that the first user is in a bad mood;
   determining, based on the new biological information of the first user, whether the first user is in a bad mood or in a good mood;
   accepting selection by the first user of whether to transmit the message that has not been transmitted, in a case where it is determined, based on the new biological information, that the first user is in a good mood; and
   transmitting the message that has not been transmitted and stored in the memory, in a case where the first user selects to transmit the message that has not been transmitted.

3. The information processing method according to claim 2, further comprising
   discarding the message that has not been transmitted and stored in the memory, in a case where the first user selects not to transmit the message that has not been transmitted.

4. The information processing method according to claim 2, further comprising:
   accepting correction, by the first user, of the message that has not been transmitted and stored in the memory; and
   transmitting the corrected message.

5. The information processing method according to claim 1, further comprising:
   determining whether predetermined wording is included in the accepted message; and transmitting the accepted message, in response to determining that the predetermined wording is included in the accepted message.

6. The information processing method according to claim 2, wherein
the accepting of the selection includes:
presenting the message that has not been transmitted, in a case where it is determined, based on the new biological information, that the first user is in a good mood,
displaying, on a display, a display screen for accepting selection by the first user of whether to transmit the message that has not been transmitted, and
accepting the selection by the first user of whether to transmit the message that has not been transmitted.

7. The information processing method according to claim 6, further comprising
after the display screen is displayed, in a case where a selection operation by the first user is not accepted for a predetermined time, outputting, to a voice output unit, voice information prompting the first user to select whether to transmit the message that has not been transmitted.

8. The information processing method according to claim 6, further comprising:
determining whether predetermined wording is included in the message that has not been transmitted; and
in a case where it is determined that the predetermined wording is included in the message that has not been transmitted, displaying the predetermined wording included in the message in a form different from a form of other words.

9. The information processing method according to claim 2, wherein
the accepting of the selection includes:
presenting the message that has not been transmitted, in a case where it is determined, based on the new biological information, that the first user is in a good mood,
outputting, to a voice output unit, voice information for accepting the selection by the first user of whether to transmit the presented message that has not been transmitted, and
accepting the selection by the first user of whether to transmit the message that has not been transmitted.

10. An information processing device comprising:
a processor; and
a memory, wherein
the processor
acquires biological information of a first user using the information processing device to transmit a message,
accepts an input by the first user of the message to be transmitted to another information processing device that is used by a second user to receive the message and is different from the information processing device used by the first user,
determines, based on the biological information of the first user using the information processing device to transmit the message, whether the first user is in a bad mood, and
in response to determining that the first user using the information processing device to transmit the message is in a bad mood, stops transmission of the accepted message from the information processing device to the other information processing device, and stores, in the memory, the accepted message that has not been transmitted.

11. A non-transitory recording medium storing an information processing program causing a processor of an information processing device to execute a process, the process comprising:
acquiring biological information of a first user using the information processing device to transmit a message;
accepting an input by the first user of the message to be transmitted to another information processing device that is used by a second user to receive the message and is different from the information processing device used by the first user;
determining based on the biological information of the first user using the information processing device to transmit the message, whether the first user is in a bad mood; and
in response to determining that the first user is in a bad mood, stopping transmission of the accepted message from the information processing device to the other information processing device, and storing, in a memory, the accepted message that has not been transmitted.

* * * * *